US012073814B2

(12) United States Patent
Miyazaki et al.

(10) Patent No.: US 12,073,814 B2
(45) Date of Patent: Aug. 27, 2024

(54) ELECTRONIC WIND INSTRUMENT

(71) Applicant: Yamaha Corporation, Hamamatsu (JP)

(72) Inventors: Hiroshi Miyazaki, Hamamatsu (JP); Masao Sato, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 641 days.

(21) Appl. No.: 17/200,256

(22) Filed: Mar. 12, 2021

(65) Prior Publication Data

US 2021/0304714 A1 Sep. 30, 2021

(30) Foreign Application Priority Data

Mar. 25, 2020 (JP) ................................ 2020-054224

(51) Int. Cl.
*G10H 1/34* (2006.01)
*G10H 1/00* (2006.01)
*H04R 1/02* (2006.01)

(52) U.S. Cl.
CPC ............ *G10H 1/34* (2013.01); *G10H 1/0008* (2013.01); *H04R 1/025* (2013.01); *G10H 2220/361* (2013.01)

(58) Field of Classification Search
CPC .................. G10H 1/34; G10H 1/0008; G10H 2220/361; H04R 1/025
USPC ........................................................ 84/644
See application file for complete search history.

(56) References Cited

U.S. PATENT DOCUMENTS 5,149,904 A * 9/1992 Kamiya .................. G10H 1/02 84/723
5,189,240 A * 2/1993 Kawashima ......... G10H 1/0553 84/738
10,109,267 B2 * 10/2018 Harada .................... G10H 1/32
10,360,884 B2 * 7/2019 Okuda ................... G10H 1/344
2005/0217464 A1 * 10/2005 Onozawa ................ G10H 1/34 84/723
2011/0197737 A1 * 8/2011 Masuda .................. G10D 7/00 84/330
2011/0214553 A1 * 9/2011 Masuda .................. G10D 7/00 84/349
2011/0219936 A1 * 9/2011 Masuda .................. G10D 7/00 84/330
2013/0036895 A1 * 2/2013 Masuda .................. G10D 9/06 84/400
2016/0275930 A1 * 9/2016 Harada .................... G10H 1/32
2018/0137846 A1 * 5/2018 Pouillard ................ G10H 1/32
2019/0096374 A1 * 3/2019 Harada ............... G10H 1/0551
(Continued)

FOREIGN PATENT DOCUMENTS

CN 209328499 U * 8/2019
CN 209328499 U 8/2019
(Continued)

OTHER PUBLICATIONS

Chinese-language Office Action issued in Chinese Application No. 202110305213.5 dated Jun. 7, 2023 with English translation (21 pages).

*Primary Examiner* — Christina M Schreiber
(74) *Attorney, Agent, or Firm* — Crowell & Moring LLP

(57) ABSTRACT

An electronic wind instrument includes: a breath sensor; an operating element that receives an instruct related to a pitch; a casing to which the breath sensor and the operating element are provided; a bell having a tubular shape and facing the casing; and a first separate material body that forms a fixing member fixed to the casing and attached to an outer peripheral surface of the bell.

11 Claims, 4 Drawing Sheets

(56) References Cited

U.S. PATENT DOCUMENTS

| | | | | |
|---|---|---|---|---|
| 2021/0272544 | A1* | 9/2021 | Kashiwase | G10H 1/32 |
| 2021/0304714 | A1* | 9/2021 | Miyazaki | G10H 1/0008 |
| 2021/0312896 | A1* | 10/2021 | Sato | G10H 1/32 |
| 2023/0033464 | A1* | 2/2023 | Yamamoto | G10H 1/344 |

FOREIGN PATENT DOCUMENTS

| | | | | |
|---|---|---|---|---|
| JP | 1-105987 | U | | 7/1989 |
| JP | H0746957 | Y2 | * | 10/1995 |
| JP | 2516072 | Y2 | * | 11/1996 |
| JP | 2013164542 | A | * | 8/2013 |
| JP | 2017-62327 | A | | 3/2017 |
| JP | 2017062327 | A | * | 3/2017 |
| JP | 6679864 | B2 | * | 4/2020 |

* cited by examiner

ELECTRONIC WIND INSTRUMENT

CROSS-REFERENCE TO RELATED APPLICATIONS

Priority is claimed on Japanese Patent Application No. 2020-054224, filed Mar. 25, 2020, the contents of which are incorporated herein by reference.

BACKGROUND

Field of the Invention

This disclosure relates to an electronic wind instrument.

Description of Related Art

As an electronic wind instrument that outputs sound from a speaker by breath blown thereinto, Japanese Unexamined Utility Model Application, First Publication No. H01-105987 (hereinafter referred to as Patent Document 1) discloses one that imitates an alto saxophone. The electronic wind instrument of Patent Document 1 includes a tubular casing that forms an outer shape of the main body, and a bell that is connected to a distal end in the axial direction of the casing. The casing and the bell are integrally formed of a synthetic resin.

SUMMARY

When forming the casing and the bell separately, it is necessary to fix the casing and the bell to each other.

In the case of forming the casing and the bell from different materials, it is even more difficult to directly fix the casing and the bell to each other.

The present disclosure takes into consideration the above circumstances. An object of embodiments of the present invention is to provide an electronic wind instrument in which a separately formed casing and a bell can be fixed to each other.

According to an aspect of the present invention, an electronic wind instrument includes: a breath sensor; an operating element that receives an instruct related to a pitch; a casing to which the breath sensor and the operating element are provided; a bell having a tubular shape and facing the casing; and a first, separate material body fixed to the casing and attached to an outer peripheral surface of the bell.

Other objects, advantages and novel features of the embodiments of the present invention will become apparent from the following detailed description of one or more preferred embodiments when considered in conjunction with the accompanying drawings, in which:

DETAILED DESCRIPTION

First Embodiment

Hereinafter, a first embodiment will be described, with reference to FIG. 1 and FIG. 2.

Figure 1:
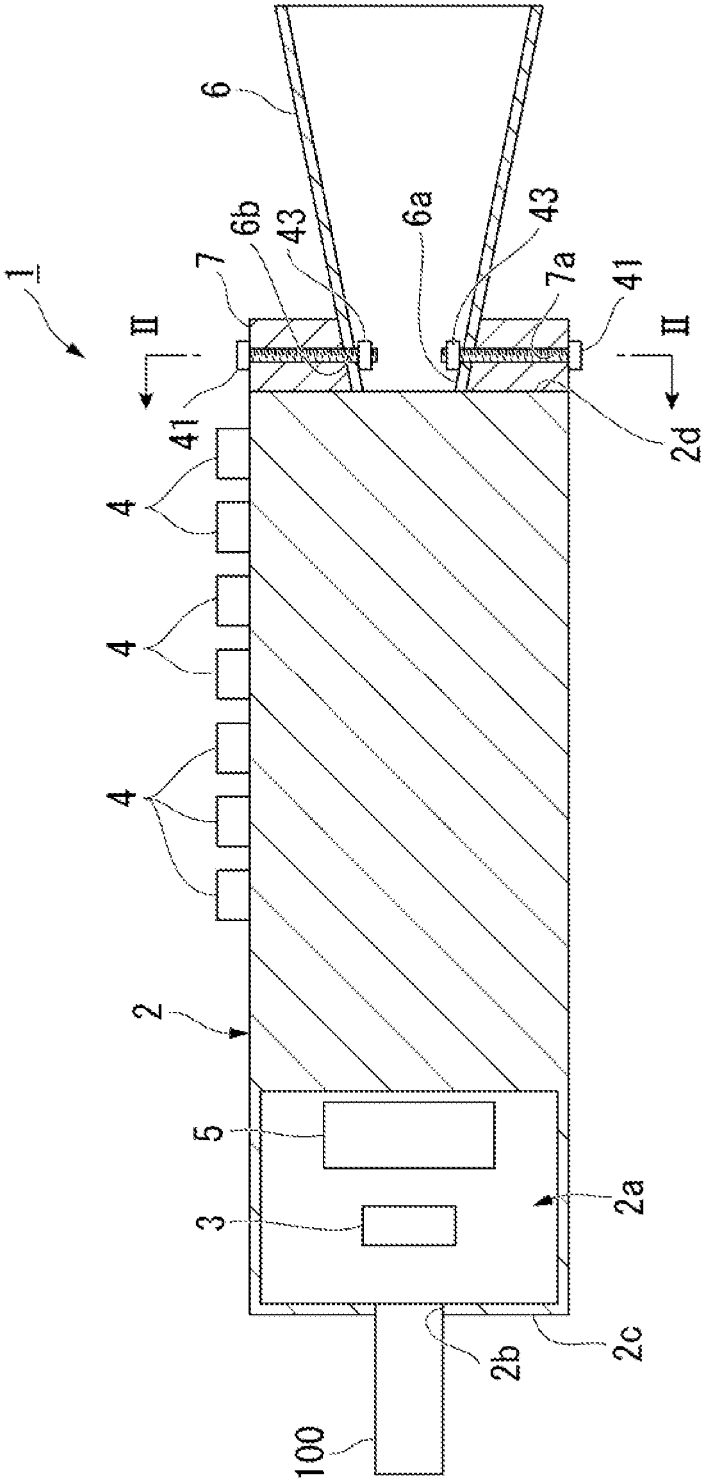
FIG. 1 is a schematic diagram showing an electronic wind instrument according to a first embodiment.
Figure 2:
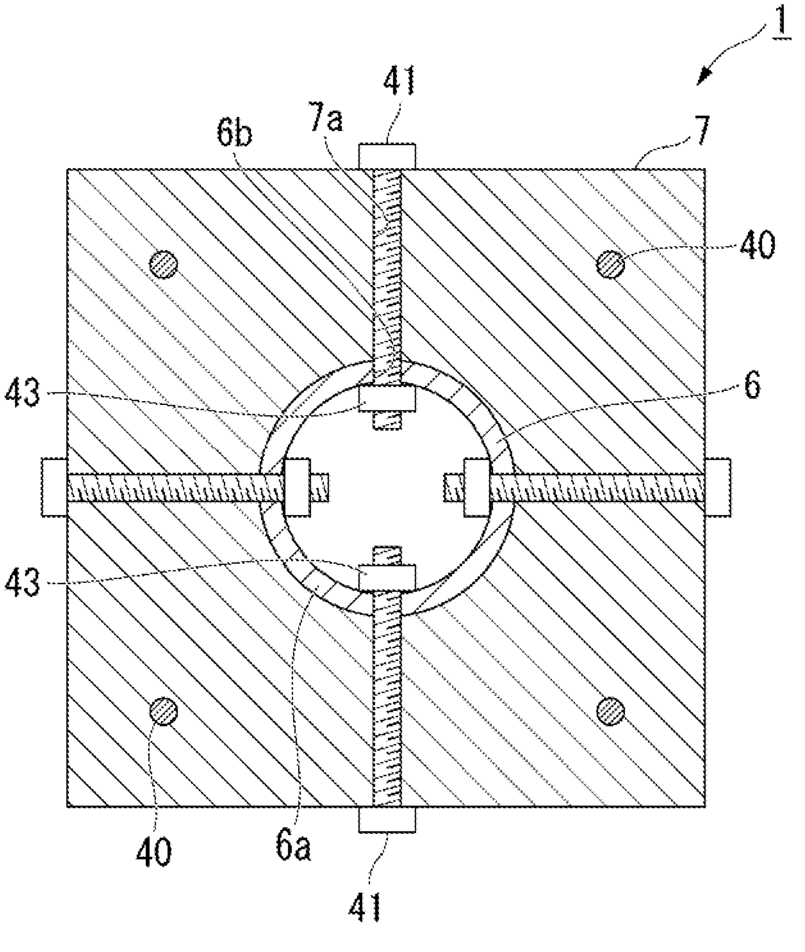
FIG. 2 is a cross-sectional view taken along the line II-II in FIG. 1.

As shown in FIG. 1, an electronic wind instrument 1 according to the first embodiment includes a casing 2, a breath sensor 3, operating elements 4, a speaker 5, a bell 6, and a first separate material body 7.

The casing 2 of the first embodiment is a linearly extending member that forms the outer shape of the electronic wind instrument 1. The casing 2 extends linearly, however, it may be curved, for example. The casing 2 of the first embodiment is formed in a rectangular parallelepiped shape, however, it may be formed in a triangular columnar shape or a cylindrical columnar shape. The casing 2 of the first embodiment is made of a resin, however, it may be made of a material other than a resin such as a metal. A housing chamber **2*a* is provided at an end part in the lengthwise direction of the casing 2. The housing chamber 2*a* is a space provided inside the casing 2. A blow-in opening 2*b* is formed at an end 2*c* in the lengthwise direction of the casing 2. The blow-in opening 2*b* penetrates the casing 2 in the lengthwise direction and connects the housing chamber 2*a* to the outside of the casing 2. In the first embodiment, a mouthpiece 100 is attached to the blow-in opening 2*b*. As a result, the housing chamber 2*a* is connected to the outside of the casing 2 through the mouthpiece 100. The mouthpiece 100 may be detachable from the blow-in opening 2*b***.

The breath sensor 3 is arranged within the housing chamber **2*a* of the casing 2. The player blows a breath to the breath sensor 3 from the mouthpiece 100 through the blow-in opening 2*b*. The breath sensor 3** detects the flow velocity and duration of a breath of the player blown thereat, and outputs breath data according to the detection results.

A plurality of operating elements 4 are provided on the outer peripheral surface of the casing 2. The plurality of operating elements 4 are arranged aligned with the lengthwise direction of the casing 2. The operating elements 4 are operated by fingers of the player to instruct at least the pitch of the sound output from the speaker 5 described later. The operating elements 4 may each be configured only with, for example, a push button to be pressed by a finger of the player, or may be of a configuration including, for example, a push button and a key mechanism for pressing a push button by being operated by a finger. The operating elements 4 detect operations performed thereon by the player and output fingering data according to results of the detection.

The speaker 5 is provided on the casing 2. The speaker 5 may be arranged within the housing chamber **2*a* of the casing 2 as shown in the example of the figure, or may be arranged outside the casing 2. The speaker 5 outputs a sound on the basis of musical performance information obtained from the breath sensor 3 and/or the operating elements 4. Specifically, the speaker 5 outputs a sound on the basis of musical performance information including breath data from the breath sensor 3 and/or fingering data from the operating elements 4**.

The speaker 5 outputs a sound when a breath of the player is blown into the mouthpiece 100. The speaker 5 may also output a sound when the player operates the operating elements 4 even in the state where, for example, the player is not blowing a breath into the mouthpiece 100.

The bell 6 is formed separately from the casing 2. The bell 6 is formed in a tubular shape and is provided at another end 2*d* in the lengthwise direction of the casing 2. The bell 6 is arranged so that an end part 6*a* thereof in the axial direction faces the other end 2*d* of the casing 2. The bell 6 of the first embodiment is a tapered tube the diameter dimension of which gradually increases. That is to say, the bell 6 is formed in a shape corresponding to the bell of an acoustic wind instrument. The bell 6 may be a cylindrical tube the diameter dimension of which does not change.

The bell 6 of the first embodiment is made of a metal. The bell 6 may be configured with a material other than metal, such as a resin. The bell 6 may be made of resin as with the casing 2. The bell 6 may be made of the same or different resin as that of the casing 2.

The first separate material body forms a first fixing member 7 that is fixed to the other end 2*d* of the casing 2. The first fixing member 7 is attached to the outer peripheral surface of the end part 6*a* of the bell 6. As shown in FIG. 2, in the first embodiment, the first fixing member 7 is formed in an annular shape surrounding the bell 6. Specifically, the inner peripheral surface of the first fixing member 7 is formed in an annular shape corresponding to the outer peripheral surface of the end part 6*a* of the bell 6. The outer shape of the first fixing member 7 is formed in accordance with the outer shape of the casing 2, specifically, is formed in a rectangular parallelepiped shape. In the case where the outer shape of the casing 2 is a triangular columnar shape or a cylindrical columnar shape, the outer shape of the first fixing member 7 may be formed in a triangular columnar shape or a cylindrical columnar shape accordingly. As a result, the outer peripheral surface of the first fixing member 7 is connected smoothly to the outer peripheral surface of the casing 2.

The first fixing member 7 of the first embodiment is made of a metal. The first fixing member 7 may be configured with a material other than metal, such as a resin.

The first fixing member 7 is fastened to the casing 2 by means of bolts 40. Each bolt 40 is attached to the first fixing member 7 and the casing 2 so as to pass through the first fixing member 7 and the casing 2 in this order in the lengthwise direction of the casing 2 (the axial direction of the bell 6).

The first fixing member 7 is fastened to the bell 6, using bolts 41 and nuts 43. Specifically, in the first fixing member 7 there are formed female screw holes 7*a* each penetrating therethrough in a direction (the radial direction of the bell 6 in the example shown in the figure) intersecting with the axial direction of the bell 6. In the end part 6*a* of the bell 6 there are formed insertion holes 6*b* each penetrating therethrough in a direction intersecting with the axial direction of the bell 6. The position of each insertion hole 6*b* corresponds to the position of each female screw hole 7*a*. The bolt 41 is inserted into each female screw hole 7*a* from the outer peripheral surface side of the first fixing member 7. The distal end part of the bolt 41 passes through the insertion hole 6*b* of the bell 6 and is inserted from the outside to the inside of the end part 6*a*. By attaching the nut 43 to the distal end part of each bolt 41, the bell 6 and the first fixing member 7 are fastened to each other. Note that without providing the insertion holes 6*b*, the bell 6 may be fixed to the first fixing member 7 by pressing each bolt 41 against the outer peripheral surface of the bell 6 arranged on the inner side of the first fixing member 7. The shapes and numbers of the bolts 40, the female screw holes 7*a*, the bolts 41, and the nuts 43 can be changed as appropriate. Moreover, when fixing the bell 6 and the first fixing member 7 to each other, an adhesive agent may be used instead of the bolts 41 and the nuts 43.

A plurality of first fixing members 7 may be arranged around the circumferential direction of the bell 6 so as to surround the end part 6*a* of the bell 6, or only one first fixing member 7 may be arranged at a part around the circumferential direction of the bell 6.

The electronic wind instrument 1 of the first embodiment includes the first fixing member 7 fixed to the casing 2 and attached to the outer peripheral surface of the bell 6. As a result, the casing 2 and the bell 6 can be fixed to each other via the first fixing member 7.

Furthermore, even in the case where the casing 2 and the bell 6 are made of different materials as in the first embodiment, the casing 2 and the bell 6 can be easily fixed to each other since the first fixing member 7 is interposed between the casing 2 and the bell 6.

In the electronic wind instrument 1 of the first embodiment, the first fixing member 7 is formed in an annular shape which surrounds the bell 6. By surrounding the outer side of the bell 6 with the first fixing member 7, the bell 6 can be attached to the first fixing member 7 in a stable state. As a result, the casing 2 and the bell 6 can be stably fixed to each other.

In the first embodiment, the shape of the first fixing member 7 is not limited to the shape described above, and can be changed as appropriate.

Second Embodiment

A second embodiment will be described, with reference to FIG. 3 and FIG. 4. In the second embodiment, components similar to those in the first embodiment are denoted by the same reference signs, and descriptions thereof will be omitted.

Figure 3:
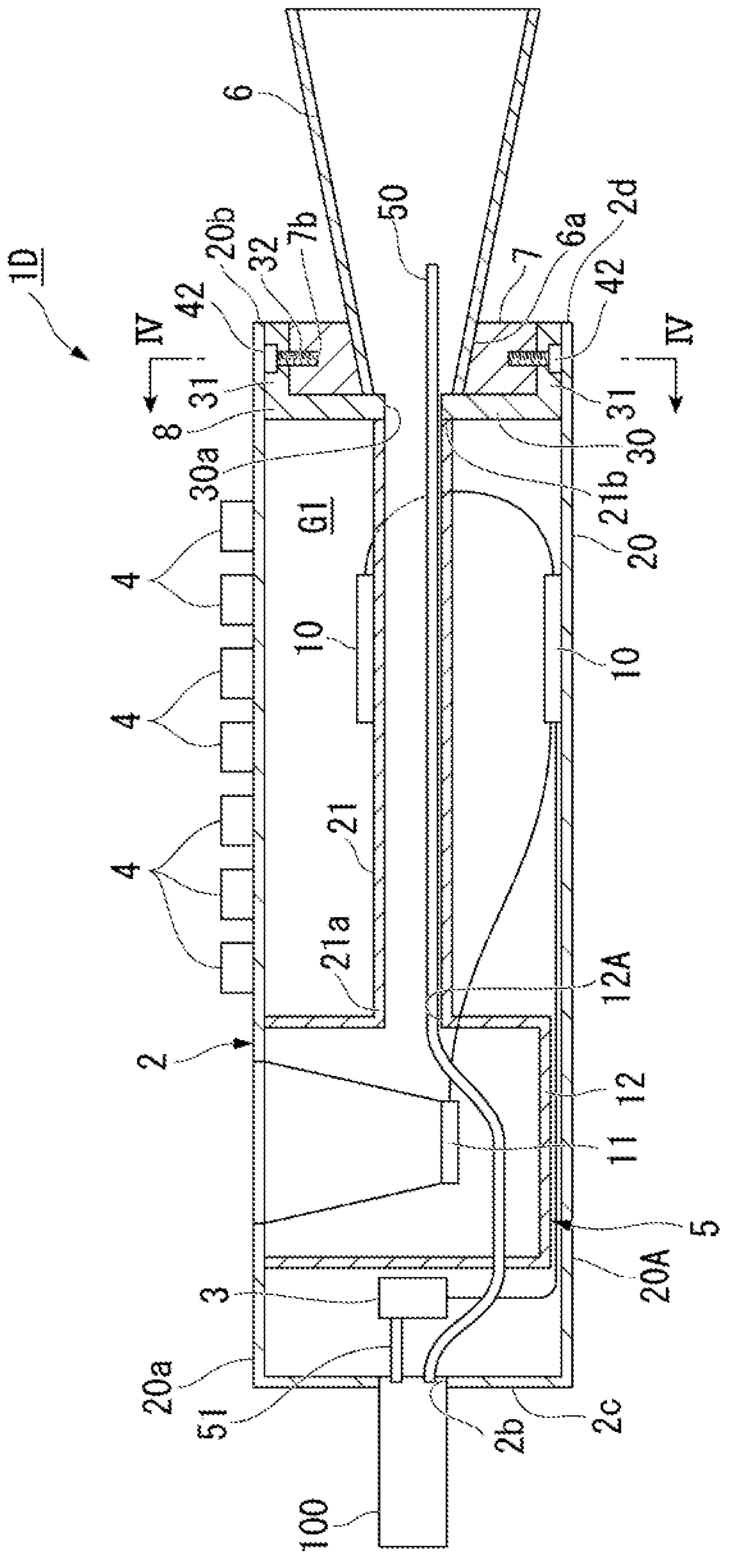
FIG. 3 is a schematic diagram showing an electronic wind instrument according to a second embodiment.

As shown in FIG. 3, an electronic wind instrument 1D according to the second embodiment includes a casing 2, a breath sensor 3, operating elements 4, a speaker 5, a bell 6, and a first, separate material body 7, as with the first embodiment. The casing 2 of the second embodiment includes an outer casing 20 and an acoustic tube 21. The electronic wind instrument 1D of the second embodiment further includes a second, separate material body 8.

The outer casing 20 is formed in a cylindrical shape which extends linearly. Note that the outer casing 20 may be curved. A blow-in opening 2*b* is formed at one end 20*a* in the axial direction of the outer casing 20. The one end 20*a* of the outer casing 20 is closed except for the blow-in opening 2*b*. A mouthpiece 100 is attached to the blow-in opening 2*b*. Another end 20*b* in the axial direction of the outer casing 20 is open. The outer casing 20 may be formed by joining a plurality of members by means of an adhesive agent or the like, or may be formed of a single member, for example. In the second embodiment, a cross section of the outer casing 20 that is orthogonal to the axial direction thereof is formed in a rectangular annular shape larger than an end part 6*a* of the bell 6 (see FIG. 4).

The breath sensor 3 and the speaker 5 are arranged inside the outer casing 20. The breath sensor 3 and the speaker 5 are arranged at a first end part 20A that is positioned on the one end 20*a* side of the outer casing 20. The breath sensor 3 and the speaker 5 are arranged in this order from the one end 20*a* side to the other end 20*b* side of the outer casing 20 in the lengthwise direction (the axial direction) of the outer casing 20. A plurality of operating elements 4 are provided on the outer peripheral surface of the outer casing 20. The plurality of operating elements 4 are arranged aligned with the lengthwise direction (the axial direction) of the outer casing 20.

The speaker 5 includes a speaker driver 11 and a speaker box 12. The speaker driver 11 generates a sound on the basis of musical performance information obtained from the breath sensor 3 and/or the operating elements 4. The speaker box 12 has a space therein and is formed in a box shape for accommodating the speaker driver 11. The speaker box 12 has an opening part 12A which is continuous (connected) with the space inside the speaker box 12 with the outside. The speaker box 12 is fixed to the outer casing 20. Specifically, the speaker box 12 is fixed to a part around the circumferential direction of a peripheral wall part of the outer casing 20 forming the first end part 20A, and is positioned at a distance from the remaining portion around the circumferential direction of the peripheral wall part. In the example shown in FIG. 3, a part of the speaker box 12 is integrally formed with the peripheral wall part of the outer casing 20, however, the embodiment is not limited to this example.

The acoustic tube 21 is provided within the outer casing 20. That is to say, the outer side of the acoustic tube 21 is surrounded by the outer casing 20. A clearance G1 is present between the outer peripheral surface of the acoustic tube 21 and the inner peripheral surface of the outer casing 20.

The acoustic tube 21 extends in the lengthwise direction (the axial direction) of the outer casing 20. The acoustic tube 21 is continuous (connected) with the space inside the speaker 5 and extends to the outside of the speaker 5. Specifically, one end 21*a* in the lengthwise direction of the acoustic tube 21 is continuous (connected) with the opening part 12A of the speaker box 12. The acoustic tube 21 extends from the opening part 12A toward the other end 20*b* of the outer casing 20. The other end 21*b* of the acoustic tube 21 (the distal end part in the extending direction of the acoustic tube 21) is positioned closer to the speaker 5 than the other end 20*b* of the outer casing 20. In the second embodiment, a cross section of the acoustic tube 21 that is orthogonal to the axial direction thereof is formed in a circular annular shape smaller than the end part 6*a* of the bell 6 (see FIG. 4).

Circuit boards 10 are provided in the clearance G1 between the acoustic tube 21 and the outer casing 20. The circuit boards 10 have a function of outputting musical sound signals to the speaker 5 on the basis of musical performance information from the breath sensor 3 and/or the operating elements 4. That is to say, the circuit boards 10 are connected to the breath sensor 3, the operating elements 4, and the speaker 5. The number of the circuit boards 10 may be one, for example. However, in the second embodiment, the circuit boards 10 are separated into a plurality of (two in the example shown in FIG. 3) circuit boards. The plurality of circuit boards 10 are connected to each other. In the example shown in FIG. 3, the same (single) circuit board 10 is connected to the breath sensor 3 and the speaker 5. However, the embodiment is not limited to this example. The same (single) circuit board 10 may be connected to at least one of the breath sensor 3, the operating elements 4, and the speaker 5.

The plurality of circuit boards 10 are fixed, by means of screw fastening or the like, to both the outer peripheral surface of the acoustic tube 21 and the inner peripheral surface of the outer casing 20. The circuit boards 10 may be fixed to only one of the outer peripheral surface of the acoustic tube 21 and the inner peripheral surface of the outer casing 20, for example. Moreover, the circuit boards 10 are not limited to being provided only in the clearance G1 between the outer peripheral surface of the acoustic tube 21 and the inner peripheral surface of the outer casing 20, and may also be provided between the speaker 5 and the inner peripheral surface of the outer casing 20, for example.

The second, separate material body forms a second fixing member 8 and is provided at the other end 21*b* of the acoustic tube 21. The second fixing member 8 is arranged inside the outer casing 20, that is to say, the second fixing member 8 is covered by the outer casing 20. The second fixing member 8 of the second embodiment is made of a metal. The second fixing member 8 may be configured with a material different from that of the first fixing member 7, for example, a material other than metal, such as a resin.

Figure 4:
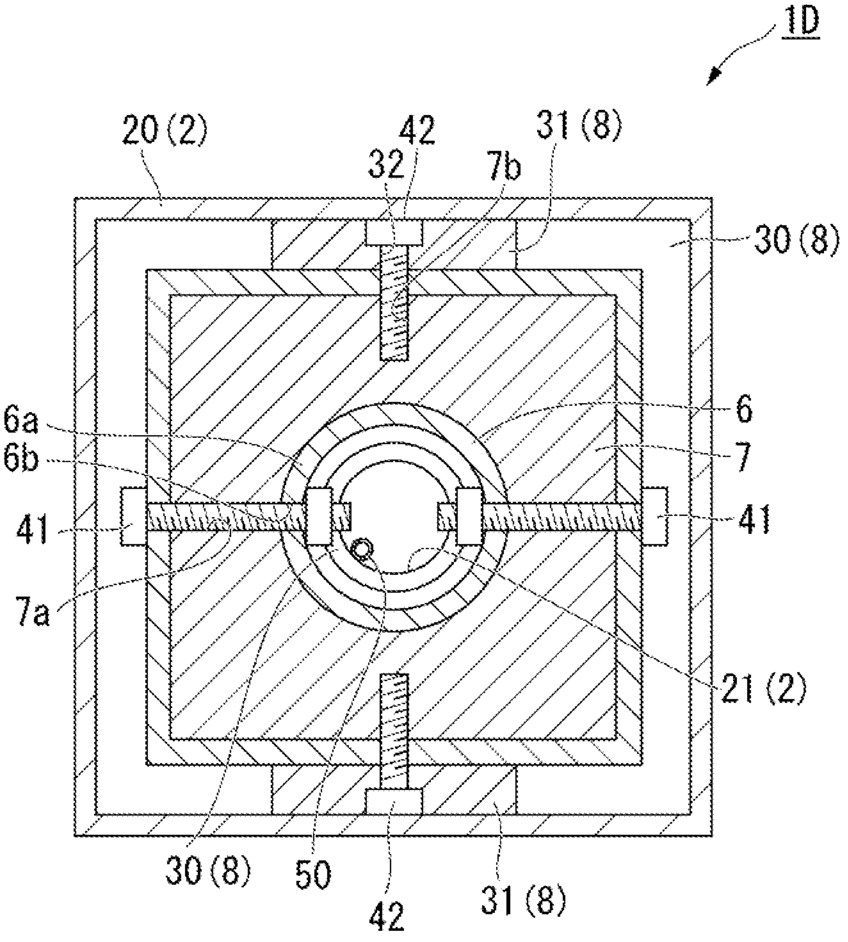
FIG. 4 is a cross-sectional view taken along the line IV-IV in FIG. 3.

As shown in FIG. 3 and FIG. 4, the second fixing member 8 has a main body part 30 and mounting pieces 31. The main body part 30 and the mounting pieces 31 are integrally formed.

The main body part 30 is formed in a plate shape. The plate thickness direction of the main body part 30 aligns with the axial direction of the acoustic tube 21. The main body part 30 is fixed to the acoustic tube 21 by means of screw fastening, an adhesive agent, or the like in a state of being abutted against the other end 21*b* of the acoustic tube 21 from the axial direction of the acoustic tube 21. The main body part 30 is formed with a through hole 30*a* penetrating in the plate thickness direction thereof. As a result, the other end 21*b* side of the acoustic tube 21 is continuous (connected) with the outside through the through hole 30*a* of the main body part 30. The inner peripheral surface of the through hole 30*a* is smoothly connected to the inner peripheral surface of the acoustic tube 21.

Each mounting piece 31 extends, in the plate thickness direction of the main body part 30, from the outer edge of the main body part 30 in a direction away from the acoustic tube 21. The number of mounting pieces 31 may be one, for example; however, in the second embodiment, a plurality of the mounting pieces 31 (two in the example shown in the figure) are arranged at intervals around the circumferential direction of the outer edge of the main body part 30. In each mounting piece 31 there is provided a screw fastening hole 32 penetrating in a direction intersecting with the lengthwise direction (the axial direction) of the outer casing 20 (the radial direction of the outer casing 20 in the example shown in the figure).

The first fixing member 7 is arranged on the inner side of the outer casing 20 at the other end 20*b* of the outer casing 20. That is to say, the first fixing member 7 is covered by the outer casing 20. The first fixing member 7 is arranged so as to be surrounded by the plurality of mounting pieces 31 of the second fixing member 8. In addition to the female screw holes 7*a*, screw fastening holes 7*b* each penetrating in a direction intersecting with the lengthwise direction (the axial direction) of the outer casing 20 are formed in the first fixing member 7 in a manner similar to that of the screw fastening hole 32 of the mounting piece 31. The position of each screw fastening hole 7*b* of the first fixing member 7 corresponds to the position of the screw fastening hole 32 of each mounting piece 31. The first fixing member 7 and the second fixing member 8 are fixed to each other by being fastened by means of bolts 42 each inserted into the screw fastening hole 7*b* and the screw fastening hole 32. As a result, the first fixing member 7 is fixed to the other end 21*b* of the acoustic tube 21 via the second fixing member 8.

The first fixing member 7 is fixed to the bell 6, using bolts 41 as with the first embodiment.

In the state where the first fixing member 7 is fixed to the bell 6, the first fixing member 7 and the second fixing member 8 are fixed to each other, and the second fixing member 8 is fixed to the acoustic tube 21, the space within the speaker 5 is continuous (connected) with the bell 6 via the acoustic tube 21 and the through hole 30*a* of the second fixing member 8. That is to say, the space within the speaker 5 is connected with the outside via the acoustic tube 21 and the bell 6.

In the state where the bell 6 is fixed to the acoustic tube 21 via the first fixing member 7 and the second fixing member 8, the inner peripheral surface of the other end 21*b* of the acoustic tube 21 (the inner peripheral surface of the through hole of the second fixing member) is positioned on the inner side of the inner peripheral surface of the bell 6 as viewed from the axial direction of the bell 6. As a result, the inner peripheral surface of the acoustic tube 21 and the inner peripheral surface of the bell 6 are connected in a stepped manner via the second fixing member 8 so as to broaden from the acoustic tube 21 side toward the bell 6 side.

The electronic wind instrument 1D of the second embodiment further includes a blow-in tube 51 and a breathing tube (breath ejection tube) 50 (a tube). The blow-in tube 51 extends from the blow-in opening 2*b* to the breath sensor 3. The breathing tube 50 extends from the blow-in opening 2*b* in the lengthwise direction (the axial direction) of the outer casing 20. The breathing tube 50 passes through the interior of the speaker box 12 and the acoustic tube 21 and extends into the bell 6.

In the state where the mouthpiece 100 is attached to the blow-in opening 2*b*, part of a breath of the player travels through the blow-in tube 51 from the mouthpiece 100 and is blown to the breath sensor 3. Moreover, the rest of the breath of the player travels through the breathing tube 50 from the mouthpiece 100, and then exits, within the bell 6, from the breathing tube 50. Saliva of the player having entered the breathing tube 50 together with the breath of the player is discharged, within the bell 6, from the breathing tube 50.

According to the electronic wind instrument 1D of the second embodiment, advantageous effects similar to those of the first embodiment can be achieved.

Furthermore, in the second embodiment, the casing 2 covers the first fixing member 7. Accordingly, it is possible to reduce the portion of the first fixing member 7 that is exposed to the outside. As a result, the appearance design of the electronic wind instrument 1D can be improved.

In the electronic wind instrument 1D of the second embodiment, the second fixing member 8 is interposed between the first fixing member 7 and the acoustic tube 21 (the casing 2), and is fixed to both the first fixing member 7 and the acoustic tube 21 (the casing 2). Accordingly, interposition of the two types of fixing members 7 and 8 between the bell 6 and the acoustic tube 21 (the casing 2) allows for increased options for the method of fixing the bell 6 and the acoustic tube 21 (the casing 2) to each other.

In the electronic wind instrument 1D of the second embodiment, the second fixing member 8 has the mounting pieces 31. In each mounting piece 31 there is provided the screw fastening hole 32 penetrating in the direction intersecting with the lengthwise direction (the axial direction) of the outer casing 20. The screw fastening holes 7*b* each penetrating in the direction intersecting with the lengthwise direction (the axial direction) of the outer casing 20 are formed in the first fixing member 7 in a manner similar to that of the screw fastening hole 32. The position of each screw fastening hole 7*b* of the first fixing member 7 corresponds to the position of the screw fastening hole 32 of each mounting piece 31. For this reason, the first fixing member 7 and the second fixing member 8 can be fastened to each other by inserting each bolt 42 in the direction intersecting with the lengthwise direction (the axial direction) of the outer casing 20. As a result, it is possible, by means of the bolts 42, to fix (attach) the first fixing member 7 and the second fixing member 8 to each other without the bolts 42 interfering with the bell 6.

In the electronic wind instrument 1D of the second embodiment, the first fixing member 7 is fixed to the other end 21*b* of the acoustic tube 21 via the second fixing member 8, and the bell 6 is continuous with the speaker 5 via the acoustic tube 21. For this reason, the sound emitted from the speaker 5 can be radiated to the outside through the acoustic tube 21 and the bell 6. That is to say, the bell 6 can be used as a radiating opening for the sound emitted from the speaker 5.

In the electronic wind instrument 1D of the second embodiment, the casing 2 has the outer casing 20 which surrounds the outer side of the acoustic tube 21. Accordingly, it is possible to reduce the portion of the acoustic tube 21 that is exposed to the outside. As a result, the appearance design of the electronic wind instrument 1D can be improved. Moreover, the appearance design of the electronic wind instrument 1D can be further improved by applying a design on the outer peripheral surface of the outer casing 20.

The electronic wind instrument 1D of the second embodiment includes the blow-in opening 2*b* for blowing a breath to the breath sensor 3, and the breathing tube 50 which extends from the blow-in opening 2*b* into the bell 6 through the first fixing member 7. As a result, the breathing tube 50 being continuous (connected) with the blow-in opening 2*b* enables suppression of blockage of the breaths. In addition, saliva blown into the blow-in opening 2*b* together with a breath can be discharged to the inside of the bell 6 through the breathing tube 50. Therefore, it is possible to suppress saliva from accumulating in the breathing tube 50.

In the electronic wind instrument 1D of the second embodiment, the inner peripheral surface of the acoustic tube 21 and the inner peripheral surface of the bell 6 are connected in a stepped manner so as to broaden from the acoustic tube 21 side toward the bell 6 side. Therefore, saliva of the player discharged from the breathing tube 50 into the bell 6 can be prevented from entering the acoustic tube 21 from the inside of the bell 6.

In the second embodiment, the casing 2 may not include the outer casing 20 and may be configured with the acoustic tube 21 only.

In the second embodiment, the second fixing member 8 may not include the mounting pieces 31 and may be configured with the main body part 30 only.

In the second embodiment, the electronic wind instrument 1D need not include the second fixing member 8. In such a case, the first fixing member 7 is fixed directly to the other end 21*b* of the acoustic tube 21, and the acoustic tube 21 and the bell 6 are fixed directly to each other.

The several embodiments have been described in detail above, however, the present invention is not limited to the above embodiments, and various modifications may be made without departing from the scope of the present invention.

In some embodiments, the mouthpiece 100 may be provided undetachable from the casing 2, for example.

In some embodiments, the breath sensor 3 is not limited to being arranged within the casing 2, and may be arranged, for example, outside the casing 2.

According to some embodiments of the present invention, it is possible to fix to each other a casing and a bell that are formed separately.

What is claimed is:

1. An electronic wind instrument comprising:

a breath sensor;

an operating element that receives an instruct related to a pitch;

a casing to which the breath sensor and the operating element are provided;

a bell having a tubular shape and facing the casing;

a first, separate, material body fixed to the casing and attached to an outer peripheral surface of the bell; and at least one elongated fixing member that penetrates through the first material body and contacts the bell.

2. The electronic wind instrument according to claim 1, wherein the first, separate, material body has an annular shape and surrounds the bell.

3. The electronic wind instrument according to claim 1, wherein the casing covers the first, separate, material body.

4. The electronic wind instrument according to claim 1, further comprising:

a second, separate, material body interposed between the first material body and the casing and fixed to the first material body and to the casing.

5. The electronic wind instrument according to claim 4, wherein the first material body forms a first fixing member and the second material body forms a second fixing member, and the second fixing member secures the bell to the casing via the first fixing member.

6. The electronic wind instrument according to claim 1, further comprising:

a speaker that outputs a sound based on musical performance information obtained from the breath sensor and/or the operating element, wherein the casing includes an acoustic tube extending from the speaker, and the first material body is fixed to the acoustic tube, and an inner space of the bell is continuous with an inner space of the speaker via an inner space of the acoustic tube.

7. The electronic wind instrument according to claim 6, wherein the casing further includes an outer casing that surrounds the acoustic tube.

8. The electronic wind instrument according to claim 1, further comprising:

a blow-in opening for blowing breath toward the breath sensor; and a tube extending from the blow-in opening to the bell through the first material body.

9. The electronic wind instrument according to claim 1, wherein the first material body forms a first fixing member that secures the bell to the casing.

10. The electronic wind instrument according to claim 1, wherein the at least one elongated fixing member comprises at least one bolt.

11. The electronic wind instrument according to claim 1, wherein the at least one elongated fixing member penetrates through the first material body in a radial direction of the bell.

* * * * *